(12) United States Patent
Gao et al.

(10) Patent No.: US 8,694,658 B2
(45) Date of Patent: Apr. 8, 2014

(54) SYSTEM AND METHOD FOR ENABLING COMMUNICATION SESSIONS IN A NETWORK ENVIRONMENT

(75) Inventors: Yifan Gao, Milpitas, CA (US); Laure F. Andrieux, San Francisco, CA (US); Zaheer Aziz, Richardson, TX (US); Hymed Besrour, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 670 days.

(21) Appl. No.: 12/234,291

(22) Filed: Sep. 19, 2008

(65) Prior Publication Data

US 2010/0082557 A1 Apr. 1, 2010

(51) Int. Cl.
*G06F 15/16* (2006.01)
(52) U.S. Cl.
USPC .......................................... 709/229; 709/227
(58) Field of Classification Search
USPC ......... 709/217–219, 223, 224, 225, 226, 227, 709/228, 229, 230, 238, 245
See application file for complete search history.

(56) References Cited

U.S. PATENT DOCUMENTS

| | | | |
|---|---|---|---|
| 2,911,462 | A | 11/1959 | Brady |
| D212,798 | S | 11/1968 | Dreyfuss |
| 3,793,489 | A | 2/1974 | Sank |
| 3,909,121 | A | 9/1975 | De Mesquita Cardoso |
| 4,400,724 | A | 8/1983 | Fields |
| 4,473,285 | A | 9/1984 | Winter |
| 4,494,144 | A | 1/1985 | Brown |
| 4,750,123 | A | 6/1988 | Christian |
| 4,815,132 | A | 3/1989 | Minami |
| 4,827,253 | A | 5/1989 | Maltz |
| 4,853,764 | A | 8/1989 | Sutter |
| 4,890,314 | A | 12/1989 | Judd et al. |
| 4,961,211 | A | 10/1990 | Tsugane et al. |
| 4,994,912 | A | 2/1991 | Lumelsky et al. |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

Jonathan Cumming (Data Connection, 2005) Session Border Control in IMS, An analysis of the requirements for Session Border Control in IMS networks, sections 1.1, 1.1.1, 1.1.3, 1.1.4, 2.1.1, 3.2, 3.3.1, 5.2.3 and pp. 7-8.*

(Continued)

*Primary Examiner* — Peling Shaw
(74) *Attorney, Agent, or Firm* — Patent Capital Group

(57) ABSTRACT

A method is provided in one example implementation and the method includes receiving a query for a policy (e.g., a multimedia session) that pertains to a selected one of first and second endpoints. Each endpoint interfaces with their respective session initiation protocol entity, which interacts with a session border controller (SBC). The method further includes negotiating credentials via a policy element and a selected SBC and determining, via a selected policy within the policy element, whether a requested communication session is prohibited or conducted between the endpoints. In more specific embodiments, each SBC makes a mapping between signaling entity information and pre-configured SBC virtual private network (VPN) information used for dynamic configuration of the communication session, and wherein a SIP [or other communication protocol] adjacency configuration is created, where adjacency characteristics are defined for each enterprise in which the endpoints reside.

19 Claims, 2 Drawing Sheets

(56) References Cited

U.S. PATENT DOCUMENTS

| | | |
|---|---|---|
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A * | 3/1996 | Fischer .................. 370/392 |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et a |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |

(56) References Cited

U.S. PATENT DOCUMENTS

| | | |
|---|---|---|
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher et al. |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| 7,920,158 B1 | 4/2011 | Beck et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,289,363 B2 | 10/2012 | Buckler |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0112073 A1* | 8/2002 | MeLampy et al. ............ 709/240 |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0149724 A1 | 8/2003 | Chang |
| 2003/0160861 A1 | 8/2003 | Barlow et al. |
| 2003/0179285 A1 | 9/2003 | Naito |
| 2003/0185303 A1 | 10/2003 | Hall et al. |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0056056 A1 | 3/2006 | Ahiska et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0121568 A1 | 6/2006 | Drapeau et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |

(56) References Cited

U.S. PATENT DOCUMENTS

| | | |
|---|---|---|
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1* | 5/2007 | Eftis et al. ................. 709/227 |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer |
| 2007/0189219 A1 | 8/2007 | Navali et al. |
| 2007/0192381 A1* | 8/2007 | Padmanabhan ............ 707/201 |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1* | 9/2007 | Oz et al. .................... 370/389 |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0263079 A1 | 11/2007 | Graham et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0068446 A1 | 3/2008 | Barkley et al. |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Eibye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0051756 A1 | 2/2009 | Trachtenberg |
| 2009/0079812 A1 | 3/2009 | Crenshaw et al. |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | Macdonald et al. |
| 2009/0256901 A1 | 10/2009 | Mauchly et al. |
| 2009/0279476 A1 | 11/2009 | Li et al. |
| 2009/0322082 A1 | 12/2009 | Wagoner et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0079355 A1 | 4/2010 | Kilpatrick et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | DeBeer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2011/0008017 A1 | 1/2011 | Gausereide |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0193982 A1 | 8/2011 | Kook et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/047291 | 10/1998 |
| WO | WO 99/059026 | 11/1999 |
| WO | WO 01/033840 | 5/2001 |
| WO | WO 2005/013001 A2 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2009/102503 A2 | 8/2009 |
| WO | WO 2009/120814 A2 | 10/2009 |
| WO | WO 2010/059481 | 5/2010 |

(56) References Cited

FOREIGN PATENT DOCUMENTS

| WO | WO2010/096342 | 8/2010 |
|---|---|---|
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

U.S. Appl. No. 12/781,722, filed May 17, 2010, entitled "System and Method for Providing Retracting Optics in a Video Conferencing Environment," Inventor(s): Joseph T. Friel, et al.

U.S. Appl. No. 12/877,833, filed Sep. 8, 2010, entitled "System and Method for Skip Coding During Video Conferencing in a Network Environment," Inventors: Dihong Tian et al.

U.S. Appl. No. 12/870,687, filed Aug. 27, 2010, entitled "System and Method for Producing a Performance Via Video Conferencing in a Network Environment," Inventors: Michael A. Arnao et al.

U.S. Appl. No. 12/912,556, filed Oct. 26, 2010, entitled "System and Method for Provisioning Flows in a Mobile Network Environment," Inventors: Balaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/873,100, filed Aug. 31, 2010, entitled "System and Method for Providing Depth Adaptive Video Conferencing," Inventors: J. William Mauchly et al.

U.S. Appl. No. 12/946,679, filed Nov. 15, 2010, entitled "System and Method for Providing Camera Functions in a Video Environment," Inventors: Peter A.J. Fornell, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors: David J. Mackie et al.

U.S. Appl. No. 12/950,786, filed Nov. 19, 2010, entitled "System and Method for Providing Enhanced Video Processing in a Neteork Environment," David J. Mackie.

U.S. Appl. No. 12/907,919, filed Oct. 19, 2010, entitled "System and Method for Providing Connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture Interface Control," Inventors: Shuan K. Kirby, et al.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for managing Flows in a Mobile Network Environment," Inventors: Balaji Venkat Venkataswami et al.

U.S. Appl. No. 12/946,709, filed Nov. 15, 2010, entitled "System and Method for Providing Enhanced Graphics in a Video Environment," Inventors: John M. Kanalakis, Jr., et al.

U.S. Appl. No. 29/375,624, filed Sep. 24, 2010, entitled "Mounted Video Unit" Inventor(s): Ashok T. Desai et al.

U.S. Appl. No. 29/375,627, filed Sep. 24, 2010, entitled "Mounted Video Unit," Inventor(s): Ashok T. Desai et al.

U.S. Appl. No. 29/369,951, filed Sep. 15, 2010, entitled "Video Unit With Integrated Features," Inventor(s): Kyle A. Buzzard et al.

U.S. Appl. No. 29/375,458, filed Sep. 22, 2010, entitled "Video Unit With Intergrated Features," Inventor(s): Kyle A. Buzzard et al.

U.S. Appl. No. 29/375,619, filed Sep. 24, 2014, entitled "Free-Standing Video Unit," Inventor(s): Ashok T. Desai et al.

PCT "International Search Report and the Written Opinion of the International Searching Authority, or the Declaration," PCT/US2010/026456, dated Jun. 29, 2010; 11 pages.

PCT "Notification of Transmittal of the International Search Report and the Written Opinion of the International Searching Authority, or the Declaration," PCT/US2009/001070, dated Apr. 4, 2009; 14 pages.

PCT "International Preliminary Report on Patentability and Written Opinion of the International Searching Authority," PCT/US2009/038310; dated Sep. 28, 2010; 10 pages.

PCT International Preliminary Report on Patentability mailed Aug. 26, 2010 for PCT/US2009/001070; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

3G, "World's First 3G Video Conference Service with New TV Commercial," Apr. 28, 2005, 4 pages; http://www.3g.co.uk/PR/April2005/1383.htm.

Andersson, L., et al., "LDP Specification," Networking Group, RFC 3036, Jan. 2001, 133 pages; http://tools.ietf.org/html/rfc3036.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-ids/draft-beriz-mails-mpls-mibility-01.txt.

Chan, Eric, et al., "Experiments on block-matching techniques for video coding," Multimedia Systems; 9 Springer-Verlag 1994, Multimedia Systems (1994) 2 pages.

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1
&ved=0CB4QFjAA&url=http%3A%2F%2Fciteseerx.ist.psu.
edu%2Fviewdoc%2Fdownload%3Fdoi%3D10.1.1.93.
103%26rep%3Drep1%26type%3Dpdf
&ei=A28RTLKRDeftnQeXzZGRAw
&usg=AFQjCNHpwj5MwjgGp-3goVzSWad6CO-jzw.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

Digital Video Enterprises, "DVE Eye Contact Silhouette," 1 page, © DVE 2008; http://www.dvetelepresence.com/products/eyeContactSilhouette.asp.

Gluckman, Joshua, et al., "Rectified Catadioptric Stereo Sensors," 8 pages, retrieved and printed on May 17, 2010; http://cis.poly.edu/~gluckman/papers/cvpr00.pdf.

Gundavelli S., et al., "Proxy Mobile IPv6," Network Working Group, RFC 5213, Aug. 2008, 93 pages; http://tools.ietf.org/pdf/rfc5213.pdf.

Hepper, D., "Efficiency Analysis and Application of Uncovered Background Prediction in a Low BitRate Image Coder," IEEE Transactions on Communications, vol. 38, No. 9, pp. 1578-4584, Sep. 1990.

Jamoussi, Bamil, "Constraint-Based LSP Setup Using LDP," MPLS Working Group, Sep. 1999, 34 pages; http://tools.ietf.org/html/draft-ietf-mpis-cr-ldp-03.

Jeyatharan, M., et at, "3GPP TFT Reference for Flow Binding," MEXT Working Group, Mar. 2, 2010, 11 pages; http:/www.ietf.org/id/draft-jeyatharan-mext-flow-tftemp-reference-00.txt.

Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=
47A1E7E028C6503975E633895D114EC?doi=10.1.1.42.1772
&rep=rep1&type=pdf, Apr. 20, 2011.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa

(56) References Cited

OTHER PUBLICATIONS

Barbara, Nov. 2004, 288 pages; http://fulfillment.umi.com/dissertations/b7afbcb56ba72fdb14d26dfccc6b470f/1291487062/3143800.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1,29.8621&type=ab.

"Real-time Hand Motion/Gesture Detection for HCI-Demo 2," video clip, YouTube, posted Dec. 17, 2008 by smmy0705, 1 page; www.youtube.com/watch?v.mLT4CFLIi8A&feature=related.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

"Simple Hand Gesture Recognition," video clip, YouTube, posted Aug. 25, 2008 by pooh8210, 1 page; http://www.youtube.com/watch?v=F8GVeV0dYLM&feature=related.

Soliman, H., et al., "Flow Bindings in Mobile IPv6 and NEMO Basic Support," IETF MEXT Working Group, Nov. 9, 2009, 38 pages; http:fitools.iettorg/html/draft-ietf-mext-flow-binding-04.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Trevor, Darrell, "A Real-Time Virtual Mirror Display," 1 page, Sep. 9, 1998; http://people.csail.mit.edu/trevor/papers/1998-021/node6.html.

Wachs, J., et al,, "A Real-time Hand Gesture System Based on Evolutionary Search," Vision, 3$^{rd}$ Quarter 2006, vol. 22, No, 3, 18 pages; http://web.ics.purdue.edu/~jpwachs/papers/3q06vi.pdf.

Wang, Robert and Javan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic,"Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Gestural user input," video clip, YouTube, posted by rkeltset on May 19, 2010, 1 page; http://www.youtube.com/watch?v3JWYTtBjdTE.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwjkWP6Sw.

Wang, Robert and Jovan Popovic, "Desktop virtual reality," video clip, YouTube, posted by rkeltset on Apr. 8, 2010, 1 page; http://www.youtube.com/watch?v=9rBtrn621Lkfk.

Wang, Robert and Jovan Popovic, "Bimanual rotation and scaling," video clip, YouTube, posted by rkeltset on Apr. 14, 2010, 1 page; http://www.youtube.com/watch?v=7TPESCX79U.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wi-Fi Protected Setup, from Wikipedia, Sep. 2, 2010, 3 pages http://en.wikipedia.org/wiki/Wi-Fi_Protected_Setup.

Xia, F., et al., "Home Agent Initiated Flow Binding for Movile IPv6," Network Working Group, Oct. 19, 2009, 15 pages; http://tools.ietf.orghtml/draft-xia-mext-ha-init-flow-binding-01.txt.

Yegani, P. et al., "GRE Key Extensions for Mobile IPv4," Network Working Group, Feb. 2006, 11 pages; http://tools.ietf.org/pdf/draft-yegani-gre-key-extension-01.pdf.

Zhong, Ren et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris" video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by ziggles on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: 20, 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page [Retrieved and printed Dec. 1, 2010] http://vimeo.com/2821182.

Feld, Brad, "Science Fact," Oblong Industries, Inc. Web Log, Nov. 13, 2008, 2 pages, http://oblong.com/article/084H-PKI5Tb9l4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

U.S. Appl. No. 12/784,257, filed May 20, 2010, entitled "Implementing Selective Image Enhancement," Inventors: Dihong Tian et al.

Arrington, Michael, "eJamming—Distributed Jamming," TechCrunch; Mar. 16, 2006; http://www.techcrunch.com/2006/03/16/ejamming-distributed-jamming/: 1 page.

Beesley, S.T.C., et al., "Active Macroblock Skipping in the H.264 Video Coding Standard," in Proceedings of 2005 Conference on

(56) References Cited

OTHER PUBLICATIONS

Visualization, Imaging, and Image Processing—VIIP 2005, Sep. 7-9, 2005, Benidorm, Spain, Paper 480-261.ACTA Press, ISBN: 0-88986-528-0; 5 pages.
Chan et al., "Experiments on Block-Matching Techniques for Video Coding," Multimedia Systems, vol. 2, 1994, pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
"Cisco Expo Germany 2009 Opening," Posted on YouTube on May 4, 2009; http://www.youtube.com/watch?v=SDKsaSlz4MK; 2 pages.
eJamming Audio, Learn More: [retrieved and printed on May 27, 2010] http://www.ejamming.com/learnmore/; 4 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
"France Telecom's Magic Telepresence Wall," Jul. 11, 2006: http://www.humanproductivitylab.com/archive_blogs/2006/07/11/france_telecoms_magic_telepres_1.php: 4 pages.
Guili, D., et al., "Orchestral: A Distributed Platform for Virtual Musical Groups and Music Distance Learning over the Internet in JavaTM Technology", [retrieved and printed on Jun. 6, 2010] http:ieeexplore.ieee.org/stamp/stamp.jsp?tp=&arnumber=778626; 2 pages.
He, L., et al., "The Virtual Cinematographer: A Paradigm for Automatic Real-Time Camera Control and Directing," Proc.SIGGRAPH, © 1996; http://research.microsoft.com/en-us/um/people/lhe/papers/siggraph96.vc.pdf; 8 pages.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_Kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kim, Y.H., et al., "Adaptive mode decision for H.264 encoder," Electronics letters, vol. 40, Issue 19, pp. 1172-1173, sep. 2004; 2 pages.
Lee, J. and Jeon, B., "Fast Mode Decision for H.264," ISO/IEC MPEG and ITU-T VCEG Joint Video Team, Doc.JVT-J033, Dec. 2003; http://media.skku.ac.kr/publications/paper/IntC/ljy_ICME2004.pdf; 4 pages.
Liu, Z., "Head-Size Equalization for Better Visual Perception of Video Conferencing," Proceedings, IEEInternational Conference on Multimedia & Expo (ICME2005), Jul. 6-8, 2005, Amsterdam, The Netherlands: http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, Austin, TX; http://citeseerx.ist.psu.edu/viewdoc/summary?doi=10.1.1.50.8405; 5 pages.
"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.
Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.
PCT "International Search Report and the Written Opinion of the International Searching Authority, or the Declaration," PCT/US2010/026456, dated Jun. 29, 2010, 11 pages.
PCT Search Report for PCT Application No. PCT/US2009/064061 dated Feb. 11, 2010, 4 pages.
PCT Written Opinion for PCT Application No. PCT/US2009/064061 dated Feb. 23, 2010; 14 pages.
Pixel Tools "Rate Control and H.264 rate control algorithm dynamically adjusts encoder parameters," [retrieved and printed on Jun. 10, 2010] http://www.pixeltools.om/rate_control_paper.html; 7 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf: 6 pages.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
Schroeder, Erica, "The Next Top Model—Collaboration," Collaboration, The Workspace: A New World of Communication, Mar. 9, 2009; http//blogs.cisco.com/collaboration/comments/the_next_top_model; 3 pages.
Shum, H.-Y, et al., "A Review of Image-Based Rendering Techniques," In SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Sullivan, Gary J., et al., "Video Compression—From Concepts to the H.264/AVC Standart," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Xin, Jun, et al., "Efficient macroblock coding-,pde decision for H.264/AVC video coding," Technical Repot MERL 2004-079, Mitsubishi Electric Research Laboratories, Jan. 2004; www.merl.com/publications/TR2004-079/; 12 pages.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
Avrithis, Y., et al., "Color-Based Retrieval of Facial Images," European Signal Processing Conference (EUSIPCO '00), Tampere, Finland; Sep. 2000; 18 pages.
Farrukh, A., et al., Automated Segmentation of Skin-Tone Regions in Video Sequences, Proceedings IEEE Students Conference, ISCON_apos_02; Aug. 16-17, 2002; pp. 122-28; 7pgs.
Guernsey, Lisa, "Toward Better Communication Across the Language Barrier," Jul. 29, 1999, http://www.nytimes.com/1999/07/29/technology/toward-better-communication-across-the-language-barrier.html; 2 pages.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755; 13 pages.
"Robust Face Localisation Using Motion, Colour & Fusion" Dec. 10, 2003; Proc. VIIth Digital Image Computing: Techniques and Applications, Sun C. et al (Eds.), Sydney; 10 pgs.; Retrieved from the

(56) References Cited

OTHER PUBLICATIONS

Internet: http://www.cmis.csiro.au/Hugues.Talbot/dicta2003/cdrom/pdf/0899.pdf; pp. 899-908, XP007905630.
School of Computing, "Bluetooth over IP for Mobile Phones," 1 page http://www.computing.dcu.ie/wwwadmin/fyp-abstract/list/fyp_details05.jsp?year=2005&number=51470574.
Sena, "Industrial Bluetooth," 1 page http://www.sena.com/products/industrial_bluetooth, printed on Apr. 22, 2009.
Shaffer, Shmuel, "Translation—State of the Art" presentation; Jan. 15, 2009; 22 pages.
Shi, C. et al., "Automatic Image Quality Improvement for Videoconferencing," IEEE ICASSP ©2004, 4 pgs.
Smarthome, "IR Extender Expands Your IR Capabilities," 3 pages http://www.smarthome.com/8121.html, printed Apr. 22, 2009.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; pp. 78-88; XP007905596; 11 pgs.
"Super Home Inspectors or Super Inspectors," printed Mar. 18, 2010, 3 pages; http://www.umrt.com/PageManager/Default.aspx/PageID=2120325.
Total immersion, Video Gallery, copyright 2008-2009 [retrieved Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers/VidReg-final.pdf.
Tsapatsoulis, N., et al., "Face Detection for Multimedia Applications," Proceedings of the ICIP '00; Vancouver, BC, Canada; Sep. 2000; 4 pages.
Tsapatsoulis, N., et al., "Face Detection in Color Images and Video Sequences," 10$^{th}$ Mediterranean Electrotechnical Conference (MELCON), 2000; vol. 2; pp. 498-502; 21 pgs.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628; 26 pgs.
Wilson, Mark, "Dreamoc 3D Display Turns Any Phone Into Hologram Machine," Oct. 30, 2008 [retrieved Feb. 24, 2009], http://gizmodo.com/5070906/ dreamoc-3d-display-turns-any-phone-into-hologram-machine, 2 pages.
WirelessDevNet, Melody Launches Bluetooth Over IP, http://www.wirelessdevnet.com/news/2001/ 155/news5.html; 2 pages, printed on Jun. 5, 2001.
WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.
Yang, Jie, et al., "A Real-Time Face Tracker," Proceedings 3$^{rd}$ IEEE Workshop on Applications of Computer Vision; 1996; Dec. 2-4, 1996; pp. 142-147; 6 pgs.
Yang, Ming-Hsuan, et al., "Detecting Faces in Images: A Survey," vol. 24, No. 1; Jan. 2002; pp. 34-58; 25 pgs.
Yoo, Byounghun, et al., "Image-Based Modeling of Urban Buildings Using Aerial Photographs and Digital Maps," Transactions in GIS, vol. 10 No. 3, p. 377-394, 2006; 18 pages [retrieved May 17, 2010], http://icad,kaist.ac.kr/publication/paper_data/image_based.pdf.
U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,540, filed Mar. 9, 2009, entitled "System and Method for Providing Three Dimensional Video Conferencing in a Network Environment," Inventor(s): Karthik Dakshinamoorthy et al.
U.S. Appl. No. 12/400,582, filed Mar. 9, 2009, entitled "System and Method for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
"3D Particles Experiments in AS3 and Flash C53," printed Mar. 18, 2010, 2 pages; http://www.flashandmath.com/advanced/fourparticles/notes.html.
Active8-3D—Holographic Projection—3D Hologram Retail Display & Video Project, [retrieved Feb. 24, 2009], http://www.activ8-3d.co.uk/3d_holocubes, 1 page.
Boccaccio, Jeff; CEPro, "Inside HDMI CEC: The Little-Known Control Feature," http://www.cepro.com/article/print/inside_hdmi_cec_the_little_known_control_feature; Dec. 28, 2007, 2 pages.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34—middle column, line 24; 3 pgs.
Chen, Jason, "iBluetooth Lets iPhone Users Send and Receive Files Over Bluetooth," Mar. 13, 2009; 1 page; http://i.gizmodo.com/5169545/ibluetooth-lets-iphone-users-send-and-receive-files-over-bluetooth.
Costa, Cristina, et al., "Quality Evaluation and Nonuniform Compression of Geometrically Distorted Images Using the Quadtree Distorion Map," EURASIP Journal on Applied Signal Processing, vol. 2004, No. 12; pp. 1899-1911; ©2004 Hindawi Publishing Corp.; XP002536356; ISSN: 1110-8657; 16 pages.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/ criminis_techrep2003-59.pdf, 41 pages.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-47, ISBN: 978-0-8186-8821-8; XP010586786, 5 pages.
Diaz, Jesus, iPhone Bluetooth File Transfer Coming Soon (Yes!); Jan. 25, 2009; 1 page; http://i.gizmodo.com/5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.
"Dynamic Displays," copyright 2005-2008 [retrieved Feb. 24, 2009], http://www.zebraimaging.com/html/lighting_display.html, 2 pages.
ECmag.com, "IBS Products," Published Apr. 2009, 2 pages; http://www.ecmag.com/index.cfm?fa=article&articleID=10065.
Electrophysics Glossary, "Infrared Cameras, Thermal Imaging, Night Vision, Roof Moisture Detection," printed Mar. 18, 2010, 11 pages; http://www.electrophysics.com/Browse/Brw_Glossary.asp.
Fiala, Mark, "Automatic Projector Calibration Using Self-Identifying Patterns," National Research Council of Canada, 2005; http://www.procams.org/ procams2005/papers/procams05-36.pdf; 6 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; 10 pages.

(56) References Cited

OTHER PUBLICATIONS

Gries, Dan, "3D Particles Experiments in AS3 and Flash CS3, Dan's Comments," printed May 24, 2010 http://www.flashandmath.com/advanced/fourparticles/notes.html; 3pgs.

Holographic Imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.

Hornbeck, Larry J., "Digital Light Processing™: A New MEMS-Based Display Technology," [retrieved Feb. 26, 2009]; http://focus.ti.com/pdfs/dlpdmd/17_Digital_Light_Processing_MEMS_display_technology.pdf, 22 pages.

"Infrared Cameras TVS-200-EX," printed May 24, 2010; 3 pgs.; http://www.electrophysics.com/Browse/Brw_ProductLineCategory.asp?CategoryID=184&Area=IS.

IR Distribution Category @ Envious Technology, "IR Distribution Category," 2 pages http://www.envioustechnology.com.au/products/product-list.php?CID=305, printed on Apr. 22, 2009.

IR Trans—Products and Orders—Ethernet Devices, 2 pages http://www.irtrans.de/en/shop/lan.php, printed on Apr. 22, 2009.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 01, 2004; pp. 288-303; 16 pages.

Itoh, Hiroyasu, et al., "Use of a gain modulating framing camera for time-resolved imaging of cellular phenomena," SPIE vol. 2979, 1997, pp. 733-740; 8 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; 8 pages.

Kazutake, Uehira, "Simulation of 3D image depth perception in a 3D display using two stereoscopic displays at different depths," http://adsabs.harvard.edu/abs/2006SPIE.6055.408U; 2006, 2 pgs.

Keijser, Jeroen, et al., "Exploring 3D Interaction in Alternate Control-Display Space Mappings," IEEE Symposium on 3D User Interfaces, Mar. 10-11, 2007, pp. 17-24; 8 pages.

Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp?tp=&arnumber=4455782&isnumber=4455723.

Lawson, S., "Cisco Plans TelePresence Translation Next Year," Dec. 9, 2008; http://www.pcworld.com/article/155237/.html?tk=rss_news; 2 pages.

Miller, Gregor, et al., "Interactive Free-Viewpoint Video," Centre for Vision, Speech and Signal Processing, [retrieved Feb. 26, 2009], http://www.ee.surrey.ac.uk/CVSSP/VMRG/Publications/miller05cvmp.pdf, 10 pages.

"Minoru from Novo is the worlds first consumer 3D Webcam," Dec. 11, 2008 [retrieved Feb. 24, 2009], http://www.minoru3d.com, 4 pages.

Mitsubishi Electric Research Laboratories, copyright 2009 [Retrieved Feb. 26, 2009], http://www.merl.com/projects/3dtv, 2 pages.

National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.

OptoIQ, "Anti-Speckle Techniques Uses Dynamic Optics," Jun. 1, 2009, 2 pages; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html.

OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2-2009/01/smart-camera-supports-multiple-interfaces.html.

OptoIQ, "Vision Systems Design—Machine Vision and Image Processing Technology," printed Mar. 18, 2010, 2 pages; http://www.optoiq.com/index/machine-vision-imaging-processing.html.

PCT "Notification of Transmittal of the International Search Report and the Written Opinion of the International Searching Authority, or the Declaration," PCT/US2009/001070, dated Apr. 8, 2009, 17 pages.

PCT Notification of Transmittal of the International Search Report and the Written Opinion of the International Searching Authority, or the Declaration; PCT/US2009/038310; dated Oct. 10, 2009; 19 pages.

Radhika, N., et al., "Mobile Dynamic reconfigurable Context aware middleware for Adhoc smart spaces," vol. 22, 2008, 3 pages http://www.acadjournal.com/2008/V22/part6/p7.

"Rayvel Business-to-Business Products," copyright 2004 [retrieved Feb. 24, 2009], http://www.rayvel.com/b2b.html, 2 pages.

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

Gussenhoven, Carlos, "Chapter 5: Transcription of Dutch Intonation," 33 pages, Nov. 9, 2003; http://www.ru.nl/publish/pp./516003/todisun-ah.pdf.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

"Vocative Case," from Wikipedia, [retrieved and printed on Mar. 3, 2011] 11 pages; http://en.wikipedia.ordwiki/Vocative_case.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,785, filed Apr. 28, 2011, entitled "System and Method for Providing Enhanced Eye Gaze in a Video Conferencing Environment," Inventors: Charles C. Byers.

Design U.S. Appl. No. 29/389,651, filed Apr. 14, 2011, entitled "Video Unit With Integrated Features," Inventor(s): Kyle A. Buzzard et al.

Design U.S. Appl. No. 29,389,654, filed Apr. 14, 2011, entitled "Video Unit With Integrated Features," Inventor(s): Kyle A. Buzzard et al.

Design U.S. Appl. No. 29/381,245, filed Dec. 16, 2010, entitled "Interface Element," Inventor(s): John M. Kanalakis, Jr., et al.

Design U.S. Appl. No. 29/381,250, filed Dec. 16, 2010, entitled "Interface Element," Inventor(s): John M. Kanalakis, Jr., et al.

Design U.S. Appl. No. 29/381,254, filed Dec. 16, 2010, entitled "Interface Element," Inventor(s): John M. Kanalakis, Jr., et al.

Design U.S. Appl. No. 29/381,256, filed Dec. 16, 2010, entitled "Interface Element," Inventor(s): John M. Kanalakis, Jr., et al.

Design U.S. Appl. No. 29/381,259, filed Dec. 16, 2010, entitled "Interface Element," Inventor(s): John M. Kanalakis, Jr., et al.

Design U.S. Appl. No. 29/381,260, filed Dec. 16, 2010, entitled "Interface Element," Inventor(s): John M. Kanalakis, Jr., et al.

Design U.S. Appl. No. 29/381,262, filed Dec. 16, 2010, entitled "Interface Element," Inventor(s): John M. Kanalakis, Jr., et al.

Design U.S. Appl. No. 29/381,264, filed Dec. 16, 2010, entitled "Interface Element," Inventor(s): John M. Kanalakis, Jr., et al.

"Lambert, "Polycom Video Communications," © 2004 Polycom, Inc., Jun. 20, 2004 http://www.polycom.com/global/documents/whitepapers/video_communications_h.239_people_content_polycom_patented_technology.pdd".

Andreopoulus, Yiannis, et al., "In-Band Motion Compensated Temporal Filtering," Signal Processing: Image Communication 19 (2004) 653-673, 21 pages http://medianetlab.ee.ucla.edu/papers/011.pdf.

(56) References Cited

OTHER PUBLICATIONS

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages, http://www.cs.ubc.ca/~murphyk/Software/Kalman/ParticleFilterTutorial.pdf.
Bakstein, Hynek, et al., "Visual Fidelity of Image Based Rendering." Center for Machine Perception, Czech Technical University, Proceedings of the Computer Vision, Winter 2004, http://www.benogo.dk/publications/Bakstein-Pajdla-CVWW04.pdf; 10 pages.
Boros, S., "Policy-Based Network Management with SNMP," Proceedings of the EUNICE 2000 Summer School Sep. 13-15, 2000, p. 3.
Cisco: Bill Mauchly and Mod Marathe; UNC Henry Fuchs, et al., "Depth-Dependent Perspective Rendering," Apr. 15, 2008, 6 pages.
Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvnci_chapter8.pdf.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
EPO Feb. 25, 2011 Communication European Patent Application No. 09725288.6; 4 pages.
EPO Aug. 15, 2011 Response to EPO Communication mailed Feb. 25, 2011 from European Patent Application No. 09725288.6; 15 pages.
"Eye Tracking," from Wikipedia, (printed on Aug. 31, 2011) 12 pages; http://en.wikipedia.org/wiki/Eye_Tracking.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Gang, Ashutosh, et aL, "Audio-Visual ISpeaker Detection Using Dynamic Bayesian Networks," IEEE International Conference on Automatic Face and Gesture Recognition, 2000 Proceedings, 7 pages http://wvvw.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, XP010927285 [Abstract Only].
Liu, Shan, et al., "Bit-Depth Scalable Coding for High Dynamic Range Video," SPIE Conference on Visual Communications and image Processing, Jan. 2008; 12 pages http://www.merl.com/papers/docs./TR2007-078.pdf.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D3058788,authDecision=-203.
OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.
Patterson. E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speechipapers/CUAVE_Eurasip2002.pdf.
PCT Sep. 25, 2007 Notification of Transmittal of the International Search Report from PCT/US06/45895.
PCT Aug. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Rikert, T.D., et al., "Gaze Estimation using Morphable models," IEEE International Conference on Automatic Face Gesture Recognition, Apr. 1998; 7 pgs http://citeseer.ist.psu.edu/viewdoc/summary?doi=10.1.1.30.9472.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Weinstein et al., "Emerging Technologies for Teleconferencing and Telepresence," Wainhouse Research 2005; http://www.ivci.com/pdf/whitepaper-emerging-technologies-for-teleconferencing-and telepresence.pdf.
Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.
PCT Sep. 13, 2011 International Preliminary Report on Patentability and the Written Opinion of the ISA from PCT/US2010/026456; 5 pages.
U.S. Appl. No. 13/298,022, filed Nov. 16, 2011, entitled "System and Method for Alerting a Participant in a Video Conference," Inventor(s): TiongHu Lian, et al.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.

(56) References Cited

OTHER PUBLICATIONS

PCT Jan. 23, 2012 International Search Report and Written Opinion of the ISA from International Application Serial No. PCT/US2011/060584; 11 pages.
PCT Jan. 23, 2012 International Search Report and Written Opinion of the ISA from International Application Serial No. PCT/US2011/060579; 10 pages.
PCT Feb. 20, 2012 International Search Report and Written Opinion of the ISA from International Application Serial No. PCT/US2011/061442; 12 pages.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
""Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".
EPO Nov. 3, 2011 Communication from European Application EP10710949.8; 2 pages.
EPO Mar. 12, 2012 Response to EP Communication dated Nov. 2, 2011 from European Application EP10710949.8; 15 pages.
EPO Mar. 20, 2012 Communication from European Application 09725288.6; 6 pages.
PRC Jan. 7, 2013 SIPO Second Office Action from Chinese Application Serial No. 200980105262.1.
Chien et al., "Efficient moving Object Segmentation Algorithm Using Background Registration Technique," IEEE Transactions on Circuits and Systems for Video Technology, vol. 12, No. 7, Jul. 2002, 10 pages.
EPO Sep. 24, 2012 Response to Mar. 20, 2012 EP Communication from European Application EP09725288.6.
EPO Jul. 10, 2012 Response to EP Communication from European Application EP10723445.2.
PRC Aug. 3, 2012 SIPO First Office Action from Chinese Application No. 200980119121.5.
PRC Dec. 18, 2012 Response to SIPO First Office Action from Chinese Application No. 200980119121.5; 16 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.
PCT Mar. 21, 2013 International Preliminary Report on Patentability from International Application Serial No. PCT/US2011/050380.
PCT May 30, 2013 International Preliminary Report on Patentability and Written Opinion from the International Searching Authority for International Application Serial No. PCT/US2011/061442.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Apr. 3, 2013 SIPO Second Office Action from Chinese Application No. 200980119121.5; 16 pages.
PRC Jun. 18, 2013 Response to SIPO Second Office Action from Chinese Application No. 200980119121.5; 5 pages.

* cited by examiner

SYSTEM AND METHOD FOR ENABLING COMMUNICATION SESSIONS IN A NETWORK ENVIRONMENT

TECHNICAL FIELD OF THE INVENTION

This invention relates in general to the field of communications and, more particularly, to a system and a method for enabling communication sessions in a network environment.

BACKGROUND OF THE INVENTION

Networking services have become increasingly important in today's society. In certain architectures, service providers may seek to offer multimedia services for their end users. In order to ensure a fast deployment of high quality multimedia sessions between businesses as a service, it is important to allow for scale, accounting, security, and enforcement of granular policies.

It is possible to establish multimedia sessions between two businesses through manual configurations. However, that process is complex, not scalable, more error prone, less secure, and generally time-consuming. Accordingly, the ability to minimize these problems or to optimize these communications presents a significant challenge to service providers, network administrators, component manufacturers, and system designers alike.

BRIEF DESCRIPTION OF THE DRAWINGS

To provide a more complete understanding of the present invention and features and advantages thereof, reference is made to the following description, taken in conjunction with the accompanying figures, in which.

DETAILED DESCRIPTION OF EXAMPLE EMBODIMENTS OF THE INVENTION

Overview

A method is provided in one example implementation and the method includes receiving a query for a policy that pertains to a selected one of first and second endpoints. Each endpoint interfaces with their respective session initiation protocol entity, which in turn interacts with a service provider's session border controller (SBC). The method further includes negotiating credentials via a policy element and a selected SBC and determining, via a selected policy within the policy element, whether a requested communication session is prohibited or conducted between the endpoints. In more specific embodiments, each SBC makes a mapping between signaling entity information and pre-configured SBC virtual private network (VPN) information used for dynamic configuration of the communication session, and wherein a SIP adjacency configuration is created, where adjacency characteristics are defined for each enterprise in which the endpoints reside. In still other embodiments, a selected SBC checks in its local database for a log of an existing configuration between two of the endpoints for the communication session requested. If an entry exists in the local database, an expired timer will be reset and the communication session will be authorized.

Figure 1:
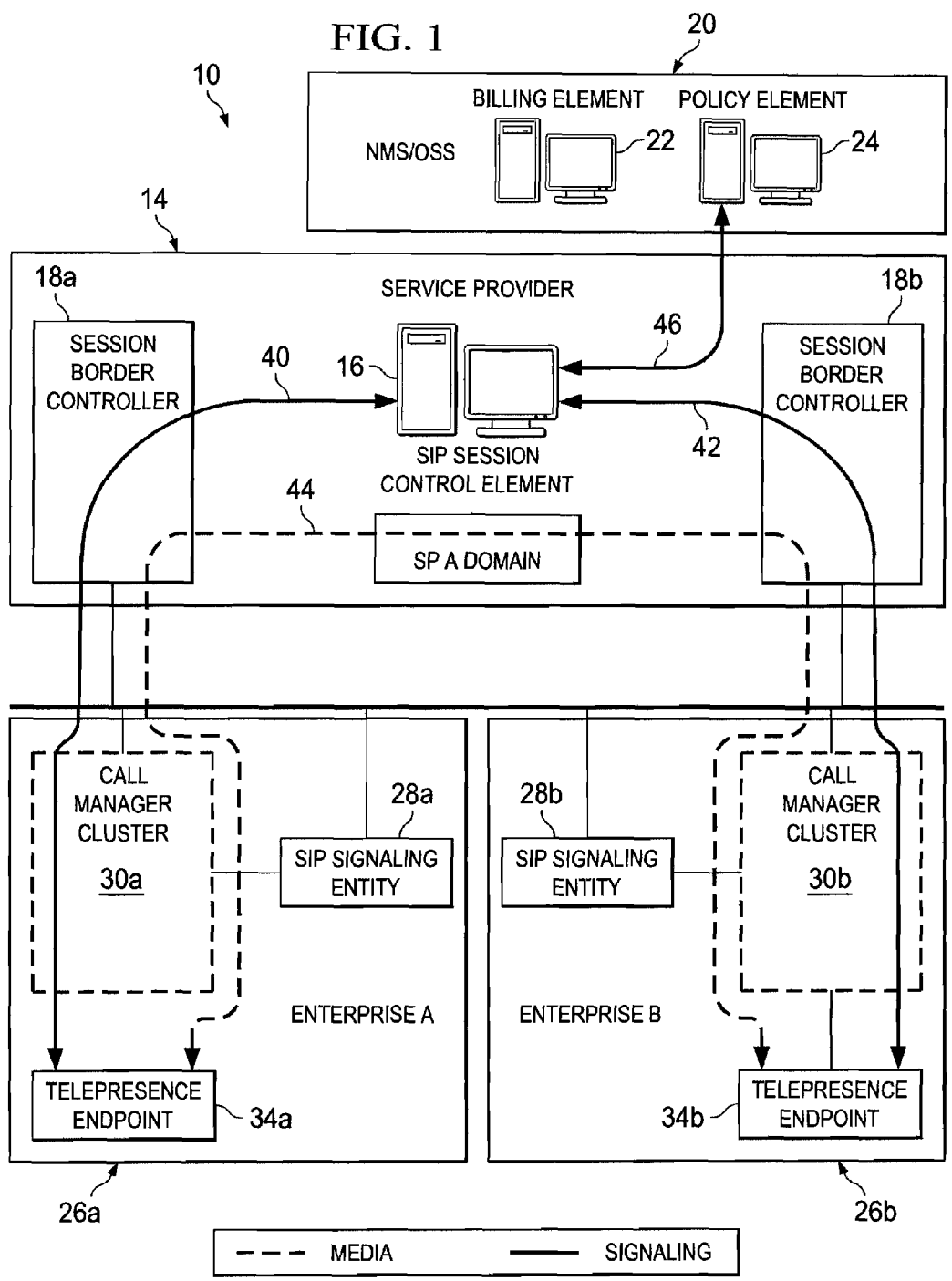
FIG. 1 is a simplified block diagram of a communications system for enabling optimal communications in a network environment in accordance with one embodiment of the present invention.

FIG. 1 is a simplified block diagram of a system level view of business-to-business calls flows, in one example implementation of the present invention. FIG. 1 illustrates a communication system 10 that includes a service provider 14, Enterprise A 26a and Enterprise B 26b, and a set of connections 40 and 44, which connect these components for signaling and media purposes, respectively. A session initiation protocol (SIP) session control element 16 is also provided in the service provider network, although the present invention is certainly not confined to SIP architectures. This element shares responsibility with session border controllers (SBCs) 18a and 18b, which are SIP signaling entities that can initiate and terminate SIP sessions coming from each Enterprise. These SBCs can also act as proxies, where the SBC can re-initiate a session toward another enterprise. Note also that the SBCs could be replaced with other communication elements, as use of the SBC component is only being offered for example purposes.

SIP session control element 16 could easily be consolidated into SBCs 18a and 18b. In another example, such as that depicted by FIG. 1, SIP session control element 16 is provided separate from these border elements. It should be noted that this is more of a logical separation (in contrast with a more physical separation) of an important component to be discussed in the context of the present invention.

FIG. 1 also includes a network management system (NMS)/operational support system (OSS) 20 that offers a service policy area within the service provider network and that hosts billing element 22 and policy element 24. A set of signaling connections 42 and 46 is also provided for SIP session control element 16. SIP signaling entities 28a and 28b service the Enterprises or they can act as SIP back-to-back user agents, which can connect to other SIP devices. FIG. 1 further includes a set of TelePresence endpoints 34a and 34b, which can enable high-resolution video conferencing. Call manager clusters 30a and 30b handle the call signaling of the call control for TelePresence.

Note that although referenced in a service provider area or identified as being part of a business-to-business (B2B) framework, any of these components may be managed or controlled by any suitable entity. In other embodiments of the present invention, the ownership of FIG. 1 is different, or all the components within FIG. 1 are controlled by a single entity. Note also that, as referred to herein, the term 'element' (as used with respect to billing element 22, policy element 24, and SIP session control element 16) is meant to encompass any device capable of further managing, processing, or directing packets in a network environment and, accordingly, includes items such as servers, routers, gateways, switches, bridges, etc.

In accordance with teachings of the present invention, communication system 10 can automate the authorization and creation of network configurations to enable two parties to initiate a high-quality multimedia session with each other. Furthermore, communication system 10 can enable a dynamic set-up of two businesses or parties to establish a high-quality multimedia session, after performing appropriate policy, call admission control (CAC) operations, and authentication checks.

The solution proposes an integrated process to offer endpoints a multimedia session service in a granular, dynamic, time efficient, manageable, and scalable fashion. Moreover, the proposed solution allows the service provider signaling entities to securely and dynamically exchange and gather information about the key characteristics of the business parties involved in the multimedia session. This information will, in turn, be verified against granular business policies and used, upon approval, to automatically generate and push an appropriate set of configurations. This would allow for the two disjointed virtual private networks (VPNs), which are operated by two distinct entities, to be bridged in a secure fashion for conducting multimedia sessions.

Before turning to some of the operational aspects of embodiments of the present invention, some preliminary information about typical B2B protocols is provided. The term 'B2B' as used herein is meant to encompass all scenarios in which there are two distinct entities, which seek to communicate with one another. The following foundational information may be viewed as a basis from which the present invention may be properly explained. Such information is offered earnestly for purposes of explanation only and, accordingly, should not be construed in any way to limit the broad scope of the present invention and its potential applications.

In current architectures, a service provider offers a B2B platform where it manages connectivity, billing, call control, etc. In a traditional Internet Protocol (IP) world, the arrangement of FIG. 1 depicts how a provider operates in offering connectivity for various Enterprises. One problem with such an arrangement is that all configurations are static. For example, if Enterprise A wishes to interact with Enterprise B, the service provider will provision the connections to allow this to happen. However, these connections are static in nature, the set-up can be slow, and these arrangements are prone to error (e.g., because it is a manual configuration). Thus, an inherent aspect of the architecture of FIG. 1 (as further detailed herein in this Specification), is that there could be some static configuration within the provider network.

In order to ensure a fast deployment of high quality multimedia sessions between businesses as a service, it is important to allow for scale, accounting, security, and enforcement of granular policies. It is possible to establish multimedia sessions between two businesses through manual configurations. The manual configuration has many shortcomings, as it offers a process that is complex, not scalable, more error prone, less secure, and generally time-consuming. Moreover, such a process does not allow for granular policy enforcement, dynamic policy configuration, and subsequent modifications.

Concisely stated, the existing manual process was not conceived as a solution adapted for the creation of a service. In addition, such a flawed process fails to address some of the essential requirements of service providers, namely; it does not allow them to easily leverage unified communications and multimedia technologies, which engenders a profitable business service.

In operation of an example flow, consider a case where Enterprise A wishes to call Enterprise B. Policy element 24 and billing element 22 will be configured with guidelines for what is permitted (i.e., the parameters) in this communication scenario (e.g., the timing, the number of calls, etc.). When Enterprise A wants to initiate this call, the policy (which could be associated with a multi-media session, a voice-call, etc.) will be pushed dynamically to devices in the service provider network (e.g., SBCs). These devices will look at the policy and then make decisions as to which activities to permit or to disallow. Thus, the architecture of FIG. 1 focuses on the dynamic application of policies (inclusive of the dynamic downloading of policies) in the service provider network. The operations can be carried out through software or other elements provided in policy element 24, along with SIP session control element 16 and SBCs 18a and 18b. Specifically, policy element 24 will include policy definitions and, further, will be systematically queried for information in making decisions as to how to accommodate requested communications involving various Enterprises.

Figure 2:
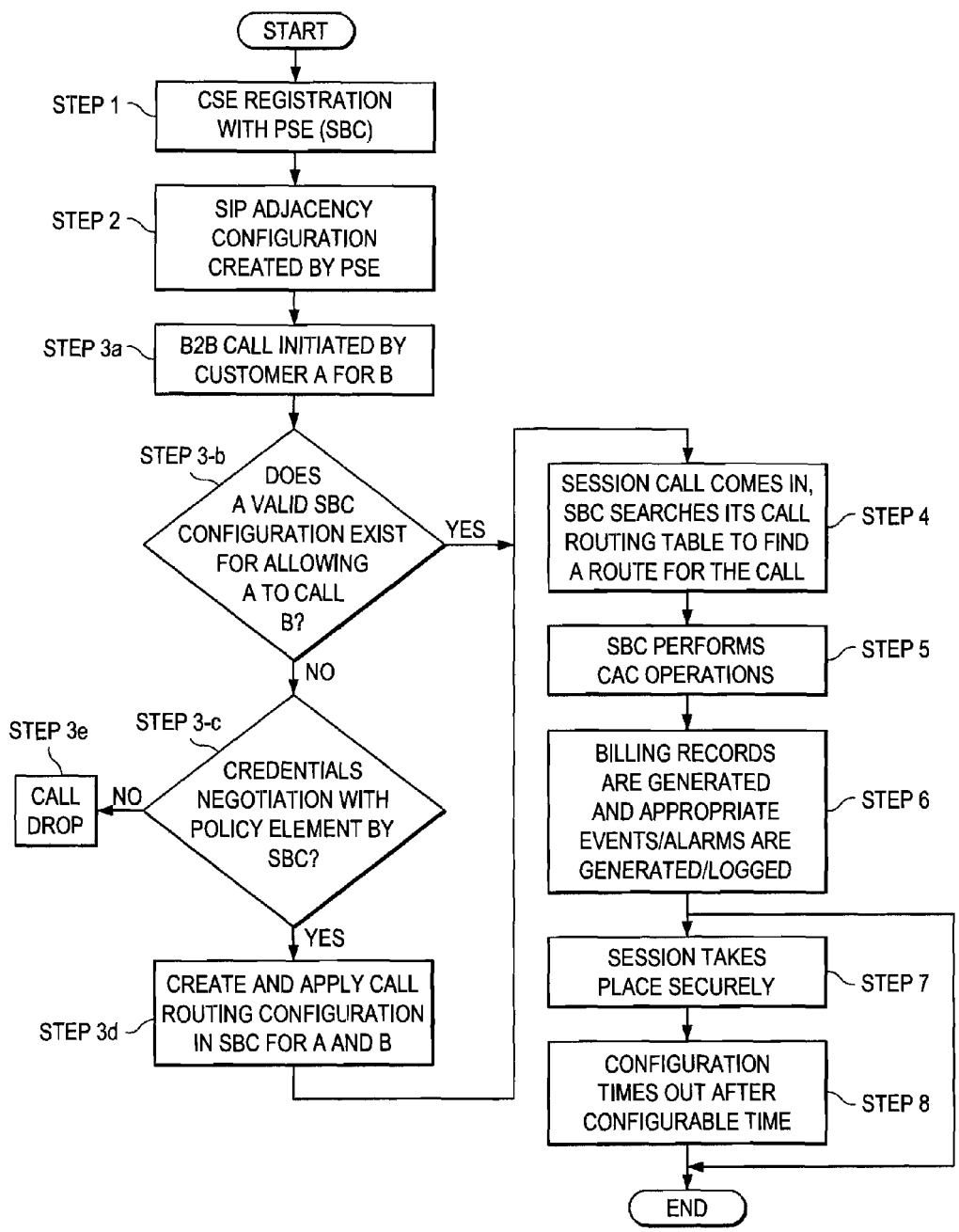
FIG. 2 is a simplified flowchart illustrating a series of example steps associated with a method for managing an optimal communication session.

Note that before turning to the example flow of FIG. 2, a brief overview of TelePresence is provided for the audience. Note also that even though FIG. 1 depicts TelePresence endpoints 34a and 34b, these could be substituted with other endpoints that could readily enjoy the benefits of the present invention and, thus, are clearly within the broad scope of the present invention. The endpoints could belong to different organizations/enterprises or departments.

The components of TelePresence use technologies in conjunction with specialized applications and hardware to create an approachable solution using the network and unified communications as core components. TelePresence can use the standard IP technology deployed in corporations and can run on an integrated voice, video, and data network. The system supports high quality, real-time voice, and video communications with branch offices using broadband connections. It offers capabilities for ensuring quality of service (QoS), security, reliability, and high availability for high-bandwidth applications such as video, particularly high-definition video.

This TelePresence architecture offers an "in-person" meeting experience over the converged network. TelePresence delivers real-time, face-to-face interactions between people and places in their work and personal lives using advanced visual, audio, and collaboration technologies. These technologies transmit life-size, high-definition images and spatial discrete audio.

In the example of FIG. 2, the depicted flow is relevant to the SBC as instantiation of the provider-signaling instance. Further, the example reflects a SIP signaling entity as an instantiation of the business customer signaling entity. The SIP signaling entity could also be a customer call manager (CCM), customer SBC, customer SIP proxy, etc.

Note that the service providers may leverage several SBCs for scalability and functionality distribution. In addition, the context of this particular example is a VPN environment. For this example, we assume that user name or call numbers are unique across different VPNs. In broader terms, a unique identifier is implemented, where the username and the call numbers constitute a unique identifier couple.

In terms of the pre-configured SBC VPN information, the SBC virtual interface configuration and the virtual routing/forwarding instance (VRF) configuration are pre-configured for each VPN business customer. Furthermore, there is a pre-configured policy for each B2B customer signaling entity or VPN site holding service and subscription details, as described in the contract between the service provider and the business customer. These policy elements are stored either on policy element 24 or on SBCs 18a and 18b.

In regards to security considerations, it is expected that there is a secure path to communicate between the two SIP end points. There are multiple methods to achieve this. For example, a multiprotocol label switching (MPLS-VPN) network offers built in security (i.e., traffic between the two SIP endpoints is generally isolated via an extranet, which represents a special case of MPLS VPN networking technology). In addition, two SIP signaling entities can also authenticate each other using authentications methods (for instance, the SBC and the customer signaling entities). B2B security is generally provided by the SBC, which can include topology hiding, NAT/address hiding, rate limiting, distributed denial of service (DDOS) protection, authenticated signaling, and media forwarding based on proper signaling sequence. Policy checking is another level of security protection. It is commonly based on an external policy element and/or SBC based policies (policy element and SBC are possible policy service entities).

Turning now to the example flow of FIG. 2, FIG. 2 represents an example involving VPNs, where Enterprise A and Enterprise B are VPN customers of the service provider. In essence, FIG. 2 can be thought of as a flowchart of the dynamic creation of B2B from A to B. In this example, there is a Provider Signaling Entity (PSE) and a Customer Signaling Entity (CSE) present.

Note that at a theoretical step 0 (not shown), there is a VPN business customer basic pre-configuration. At step 1, there is a CSE registration with a PSE (e.g., an SBC). More specifically, the provider signaling instance(s), in this instance the SBC(s), is interfacing with each party's signaling entity, which is (are) contacted for registration by each customer signaling entity. Registration messages contain specific information about the signaling entity, namely IP address for the signaling entity, and the registered endpoints characteristics.

The SBC can make a mapping between the signaling entity information and the pre-configured SBC VPN information necessary for a future dynamic configuration.
Specifically, this may include:
1) Incoming SBC virtual interface. Based on this information, the SBC can determine VPN information associated with that incoming virtual interface.
2) Source IP address of the signaling entity and /or fully qualified domain name (FQDN).
3) Characteristics of the endpoints (e.g., prefixes and domain names, etc.).

In the event that a business customer decides to prohibit a multimedia endpoint from participating in a B2B call, they can achieve this by not allowing this endpoint's information to be sent out by the signaling entity to the SBC. The above step can take place for all customers.

At step 2, there is a SIP adjacency configuration (SIP or any communication protocol for the multimedia communication session) created by the PSE. This shows how the SBCs are configured, where adjacency should be defined for each Enterprise. The connection between the Enterprise and the service provider, in this example, can be thought of as a trunk. This could define the nature of the communication, the interface to be used, etc.

More specifically for step 2, the SBC can build adjacency configuration for all information gathered from the registration of each entity (for each customer VPN). This configuration may also be generated dynamically by an external application, in which case the dynamically generated configuration can be pushed onto the SBC either directly or via external application program interfaces (APIs).

By way of example, below is a sample SBC adjacency configuration:
 adjacency sip VPN_A
 vrf VPN_A
 signaling-address ipv4 88.88.60.61
 signaling-peer 10.10.178.66
 where 88.88.60.61 is the SBC SVI address and 10.10.178.66 is the signaling entity's address.

At step 3*a*, a business-to-business session is initiated by an endpoint in the customer A area to another endpoint in the customer B area. Thus, step 3*a* is depicting a B2B call initiated by customer A for customer B. At step 3*b*, the SBC checks in its local database for a log of an existing call (or prior configuration) between the two endpoints for the business-to-business session requested. If an entry exists, it will reset the expire timer and proceed to step 4. If there is no entry or the entry timed out or is incomplete, it will proceed to step 3*c*.

Thus, in step 3*b*, the query pertains to whether there is an existing SBC configuration. Step 3*b* is asking about a previous configuration because there could be a time savings in understanding that there is an existing connection, or that policy element 24 has already been queried for certain information. Where there is an existing configuration, then the call can be expedited.

At step 3*c*, credential negotiation with policy element 24, by an SBC, occurs. Step 3e illustrates a call drop, where the call is prohibited. In step 3*c*, the SBC is negotiating directly with policy element 24 (i.e., the SBC is getting a call from a given customer, so a query is made as to what the policy is for this particular customer). The policy could be simple or sophisticated (e.g., a simple payment plan verification, a pre-payment policy issue, etc.).

At step 3*d*, the system can create and apply session routing configuration in the SBC for A and B. (Note that 'session routing' includes voice calls, as well as other types of communications such as multi-media, for example.) If the policy element does authorize this particular communication, the devices create the necessary configuration and apply the session routing configuration for the call between Enterprise A and Enterprise B. Without the session routing functionality, Enterprise A will not be able to communicate with Enterprise B. Thus, the routing protocol is being dictated by the policy element, where the subsequent configuration is downloaded to the responsible SBC.

Thus, the SBC contacts the policy service entity (policy element 24) for this specific set of signaling entities, corresponding to two specific customer VPN sites. The SBC obtains from the policy service entity the corresponding communication policy for these implicated customers. For instance, for signaling entities A and B in VPN A and VPN B respectively, the SBC will query the policy element and find out (in a simplistic example):

| "Can | VPN_A | _site | 1 | talk | to |
| VPN_B_site_3"? | | | | | |

The definition of a customer policy may be purely about whether the B2B service was contracted from the service provider and whether A agrees to have a B2B relation with customer B. Other examples of policy granular settings include maximum bandwidth, maximum number of sites, quality of service (QoS) classifications and marking, etc. For example, VPN A and VPN B may have agreed to be able to be connected for a business-to-business connection and purchased the corresponding service. It may be that VPN B was also set to be able to communicate with VPN C, but that VPN A would be not able to communicate with VPN C, for security reasons or because A and C did not purchase the service agreement for this specific communication.

Based on the policy result, the SBC will or will not dynamically build and add an input in the session routing table configuration. As mentioned earlier, the configuration can be generated by the SBC itself, by a routing policy service, a network management provisioning application, or a simple script. The dynamically generated configuration for the session routing table can be pushed onto the SBC either directly, indirectly, or via external APIs.

Once the configuration is successfully pushed, a routing and session (establishment) entry can be stored on the SBC, with a timer, which can be initiated at that point. For example:

TABLE 1 entry 1 match src-adjacency VPN_A_site_1
destination adjacency VPN_B site_3
action complete
entry 2 match adjacency VPN_B site_3
action next-table TABLE_2
entry 3 match adjacency VPN_C_site_2
destination adjacency VPN_B site_3
action complete

TABLE 2 entry 1 match number_VPN_A_site_1
destination adjacency VPN_A_site_1
action complete
entry 2 match number_VPN_C_site_2
destination adjacency VPN_C_site_2
action complete

Turning back to step 4 of the flowchart of FIG. 2, a session call is coming inbound, where the SBC searches its session routing table to find a route for the call. At step 5, the SBC performs call admission control (CAC) operations such as bandwidth, number of calls, call rate being limited, etc. Thus, these CAC operations are based on the configuration that was pushed to the SBCs from the policy element. Step 6 can include billing records being generated and appropriate events/alarms are generated/logged. In its most simplistic form, step 6 simply illustrates some record keeping functions being provided for the system. At step 7, the session takes place securely (as per the security consideration sections). At step 8, the configuration times out after some prescribed time.

In terms of highlighting some (not necessarily all) of the advantages of the architecture of communication system 10 and the previously discussed flows, such protocols do dynamically and selectively capture and parse key identifier and service parameters for each party. The architecture further dynamically creates appropriate configurations for the network entities, enabling a secure communication between the two parties. Moreover, by using policy elements, as part of the integrated process, the policy elements built-in functionality ensures that the sessions are granularly logged, accounted for, and are set up with respect to existing customer contracted policies (e.g., with their service provider).

In providing this approach, such a solution enables high-quality multimedia sessions for all platforms, such as, for instance, (but not limited to) TelePresence. Similarly, the arrangement takes a process and solution approach, which ties in security, unified communications, and better management of emerging technologies.

Software and/or hardware (inclusive of memories and processors that can execute any software application) may reside in billing element 22, and/or policy element 24, and/or SIP session control element 16, and/or SBCs 18a and 18b in order to achieve the teachings of the present invention. The software can offer the communication enhancements (outlined herein) and could be stored in any type of memory and subsequently executed by any type of processor to carry out the functionalities explained in this Specification. In one instance, only the element of these listed devices includes software (in a consolidated fashion) in order to achieve the operational advantages as outlined here. In other embodiments, any of these components may be consolidated, or any one of these can be eliminated, or added to the system elsewhere, while remaining within the broad scope of the present invention. Due to their flexibility, these items may alternatively be equipped with (or include) any suitable algorithm, hardware, component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of these outlined configurations in the context of communication system 10 and, accordingly, they should be construed as such.

Note that the examples of the preceding FIGURES have been offered for purposes of teaching only. Accordingly, some of these discussed steps may be changed, deleted, or replaced with other steps where appropriate. Such modifications may be based on particular communication needs or specific communication architectures and configurations and are within the teachings of the present invention.

As explained above, the lack of an effective communication support in static manual configurations has been a known limitation in this arrangement. This invention addresses B2B arrangements, but could be deployed in a host of other scenarios. Any such scenarios are encompassed by this Specification.

Although the present invention has been described in detail with reference to particular embodiments, it should be understood that various other changes, substitutions, and alterations may be made hereto without departing from the spirit and scope of the present invention. For example, although the present invention has been described as operating in TelePresence environments or VPN arrangements, the present invention may be used in any networking environment that could include such technology. Virtually any configuration that seeks to intelligently provision a multimedia session connection could enjoy the benefits of the present invention. Moreover, the invention can be implemented in any multimedia (or other media) supporting system providing voice, video, or fax over a packet network service.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a policy element operable to receive a query for a policy that pertains to a selected one of first and second endpoints, wherein the first and second endpoints are two distinct entities, each endpoint being associated with a virtual private network (VPN), wherein the VPNs are disjointed, wherein interaction occurs between a session border controller (SBC) and a session initiation protocol (SIP) signaling entity, wherein each SBC makes a mapping between signaling entity information and pre-configured SBC VPN information, wherein credential negotiation occurs between the policy element and the SBC such that a selected policy within the policy element determines that a requested communication session is conducted between the endpoints, wherein the pre-configured SBC VPN information is used for dynamic policy configuration of the communication session, and wherein a local database is checked for a log of an existing call and for a prior configuration between the endpoints.

2. The apparatus of claim 1, wherein the interaction includes messages that contain specific information about the SIP signaling entity and include an IP address for the signaling entity, and characteristics of respective endpoints.

3. The apparatus of claim 1, wherein a SIP adjacency configuration is created, where adjacency characteristics are defined for each enterprise in which the endpoints reside.

4. The apparatus of claim 1, wherein the selected policy includes a payment plan or a prepayment policy.

5. The apparatus of claim 1, wherein session routing configuration is created and applied in a selected SBC for selected endpoints when the call is authorized via the policy element.

6. The apparatus of claim 1, wherein the selected policy that is accessed provides parameters that include maximum bandwidth, maximum number of sites, or quality of service (QoS) classifications.

7. The apparatus of claim 1, wherein based on a policy result, a selected SBC will elect whether or not to dynamically build and add an input in a session routing table configuration.

8. The apparatus of claim 1, wherein once a configuration is successfully pushed from the policy element, a routing and session table cache entry can be stored on a selected SBC with a timer.

9. The apparatus of claim 1, wherein a selected SBC searches its session routing table to find a route for the communication session, and wherein the selected SBC performs call admission control (CAC) operations such as bandwidth, number of calls, call rate being limited.

10. The apparatus of claim 1, wherein if the communication session is authorized, billing records are generated, or events and alarms are logged.

11. The apparatus of claim 1, wherein the SBC re-initiates a session towards another enterprise.

12. The apparatus of claim 1, wherein the credential negotiation is verified against granular business policies.

13. The apparatus of claim 1, wherein the pre-configured SBC VPN information includes an incoming SBC virtual interface, a source IP address of the signaling entity, and characteristics of the first endpoint and of the second endpoint.

14. A method, comprising:
receiving a query for a policy that pertains to a selected one of first and second endpoints, wherein interaction occurs between a session initiation protocol (SIP) entity and a session border controller (SBC), and wherein the first and second endpoints are two distinct entities, each endpoint being associated with a virtual private network (VPN), wherein the VPNs are disjointed, and wherein each SBC makes a mapping between signaling entity information and pre-configured SBC VPN information;
negotiating credentials via a policy element and a selected SBC;
determining via a selected policy within the policy element whether a requested communication session is prohibited or conducted between the endpoints, wherein the pre-configured SBC VPN information is used for dynamic policy configuration of the communication session if the communication session is conducted; and
evaluating a local database for a log of an existing call and for a prior configuration between the endpoints, and wherein if an entry exists for the existing call, an expire timer is reset and the requested communication session is authorized.

15. The method of claim 14, wherein a SIP adjacency configuration is created, where adjacency characteristics are defined for each enterprise in which the endpoints reside.

16. Logic encoded in one or more non-transitory tangible media for execution and when executed by a processor operable to:
receive a query for a policy that pertains to a selected one of first and second endpoints, each endpoint being associated with a virtual private network (VPN), wherein the VPNs are disjointed, wherein interaction occurs between a session initiation protocol entity and a session border controller (SBC), and wherein the first and second endpoints are two distinct entities, and wherein each SBC makes a mapping between signaling entity information and pre-configured SBC VPN information;
negotiate credentials via a policy element and a selected SBC;
determine via a selected policy within the policy element whether a requested communication session is prohibited or conducted between the endpoints, wherein the pre-configured SBC VPN information is used for dynamic policy configuration of the communication session if the communication session is conducted; and
evaluate a local database for a log of an existing call and for a prior configuration between the endpoints, and wherein if an entry exists for the existing call, an expire timer is reset and the requested communication session is authorized.

17. The logic of claim 16, wherein a SIP adjacency configuration is created, where adjacency characteristics are defined for each enterprise in which the endpoints reside.

18. The logic of claim 16, wherein session routing configuration is created and applied in a selected SBC for selected endpoints when the call is authorized via the policy element, and wherein the selected policy that is accessed provides parameters that include maximum bandwidth, maximum number of sites, or quality of service (QoS) classifications, and wherein based on a policy result, a selected SBC will elect whether or not to dynamically build and add an input in a session routing table configuration, and wherein once a configuration is successfully pushed from the policy element, a routing and session (establishment) entry can be stored on a selected SBC with a timer.

19. A system, comprising:
means for receiving a query for a policy that pertains to a selected one of first and second endpoints, wherein interaction occurs between a session initiation protocol (SIP) entity and a session border controller (SBC), and wherein the first and second endpoints are two distinct entities that belong to two different enterprises, each endpoint being associated with a virtual private network (VPN), wherein the VPNs are disjointed;

means for negotiating credentials via a policy element and a selected SBC;

means for determining via a selected policy within the policy element whether a requested communication session is prohibited or conducted between the endpoints, wherein each SBC makes a mapping between signaling entity information and pre-configured SBC VPN information used for dynamic policy configuration of the communication session, and wherein a SIP adjacency configuration is created, where adjacency characteristics are defined for each enterprise in which the endpoints reside; and means for evaluating a local database for a log of an existing call and for a prior configuration between the endpoints, and wherein if an entry exists for the existing call, an expire timer is reset and the requested communication session is authorized.

* * * * *